(12) United States Patent
Gamble

(10) Patent No.: US 11,618,555 B2
(45) Date of Patent: Apr. 4, 2023

(54) LOAD BALANCING SYSTEM

(71) Applicant: KISS-Engineering Inc., Northridge, CA (US)

(72) Inventor: Christopher L. Gamble, Canoga Park, CA (US)

( * ) Notice: Subject to any disclaimer, the term of this patent is extended or adjusted under 35 U.S.C. 154(b) by 34 days.

(21) Appl. No.: 17/395,855

(22) Filed: Aug. 6, 2021

(65) Prior Publication Data

US 2023/0043055 A1    Feb. 9, 2023

(51) Int. Cl.
*B64C 27/00*   (2006.01)

(52) U.S. Cl.
CPC ............................. *B64C 27/008* (2013.01)

(58) Field of Classification Search
None
See application file for complete search history.

(56) References Cited

U.S. PATENT DOCUMENTS

| | | |
|---|---|---|
| RE25,383 E | 5/1963 | Morrill |
| 3,316,021 A | 4/1967 | Salathiel |
| 3,913,980 A | 10/1975 | Cobb, Jr. |
| 4,179,162 A | 12/1979 | Zarlengo |
| 8,313,296 B2 | 11/2012 | Jolly et al. |
| 8,876,036 B2* | 11/2014 | McCollough ......... B64C 27/473 244/17.11 |
| 10,526,076 B2 | 1/2020 | Heverly et al. |
| 10,994,835 B2* | 5/2021 | McCullough ........... B64C 27/06 |
| 2013/0062456 A1* | 3/2013 | McCollough ......... B64C 27/473 244/17.11 |
| 2015/0132131 A1* | 5/2015 | Welsh .................... B64C 27/008 416/145 |
| 2019/0092458 A1* | 3/2019 | McCullough ........... B64C 27/06 |

* cited by examiner

*Primary Examiner* — Juan G Flores
(74) *Attorney, Agent, or Firm* — Michael A DiNardo

(57) ABSTRACT

A load balancing system for a system of rotating elements such as a helicopter rotor or an airplane propeller. The load balancing system includes two or more balancing tubes rotationally attached to blades or props on the system of rotating elements. The balancing tubes are slightly curved and enclose a hollow space containing a quantity of weighted fluid such as mercury. During operation of the system of rotating elements, the weighted fluid disperses throughout the hollow space in the balancing tubes so as to counter any imbalance in the system of rotating elements. Centrifugal forces will cause different dispersal of the weighted fluid throughout the hollow space depending on the overall pulling or pushing forces resulting from any imbalance.

10 Claims, 14 Drawing Sheets

LOAD BALANCING SYSTEM

BACKGROUND OF THE INVENTION

The present invention is directed to a load balancing system for rotor blades on a helicopter or similar system of rotating elements. Specifically, the inventive load balancing system includes two or more tubes, each enclosing a quantity of a liquid, attached to a system of rotating elements in opposing or rotationally equally-spaced positions. When the system is at full rotation speed, the quantity of liquid in each tube will reach an equilibrium that counter-balances any irregularities in the system of rotating elements.

Various systems have been developed for properly balancing systems of rotating elements, specifically such as wheel and tire assemblies on vehicles. These prior balancing systems were designed so the tires rotated smoothly and do not wear unevenly shortening the life and tread of the tires. One of the most commonly employed systems for balancing wheel and tire assemblies is the securement of counterbalancing lead weights to the wheel at various positions based on measurements made during rotation. These arrangements are not entirely satisfactory since the weights are fixed and tend to compensate only for a single condition. In the event that condition changes due to tire wear or some other cause, the balancing is no longer effective.

Other systems have been developed for balancing tire and wheel arrangement that rely on the insertion of a plurality of mobile mass elements loosely positioned within the tire. For example, a dynamic wheel balancing system of this type is shown in U.S. Pat. No. 4,179,162 showing such a system. Other systems showing automatic rotation balancing systems for tires and wheel arrangements involve the placement of discrete mass balancing members within some type of raceway or grooveway cavity attachable to the wheel or rim. Typical of these systems are U.S. Pat. Nos. Re 25,383; 3,913,980; and 3,316,021.

The problem that arises with rotating tire wheel assemblies also is common in other systems of rotating elements. One such system is rotor blades, as on a helicopter or similar vehicle. Balancing devices for such rotor blade systems are typically of the types shown in U.S. Pat. Nos. 8,313,296 and 10,526,076. Such prior balancing devices typically have solid weights with limited adjustability and are mounted in close proximity to the axis of rotation. Solid weights with limited adjustability have a limited ability to finely balance an out-of-balance rotor system. Similarly, weights mounted in close proximity to the axis of rotation must have substantial weight to counter-balance forces on such systems of rotating elements.

Due to the foregoing and the many suggested approaches to the problem of balancing a rotating system of elements, it becomes apparent that there is a need for an effective, universal and simplified load balancing device.

Accordingly, there is a need for an improved load balancing device that has improved adjustability for weight balancing and does not require the use of substantial weights. The present invention fulfills these needs and provides other related advantages.

SUMMARY OF THE INVENTION

Briefly, the present invention provides a load balancing system for balancing or equalizing a load on a system of rotating elements about a central axis, particularly in rotors or propellers. The load balancing system of the present invention preferably comprises two or more hollow, close-ended cylinders that define an internal passage within which a flowing fluid mass is contained. The hollow, close-ended cylinders are preferably secured to the system of rotating elements by universal, freely-rotating fasteners, in positions that are oppositely disposed or uniformly spaced around the axis of rotation.

In one particular embodiment, the load balancing system is specially adapted for securement to rotor blades as on a helicopter. The tubes of the load balancing system can be attached at any point along the length of two or more rotor blades, but are particularly effective at the extreme ends of the rotor blades. The tubes are preferably attached by a freely-rotating fastener so as to allow for varying pitch in the rotor blades, while still allowing the tubes to remain parallel to the plane of rotation of the rotor blades. Further, the tubes contain an amount of liquid, preferably mercury or other similarly behaving material, to provide sufficient weight and responsiveness to unbalanced forces.

Alternate embodiments are adapted for use on rotor blades having two, three, four or other quantity of blades, with a sufficient number of balancing tubes attached to the blades so as to provide an oppositely disposed or uniformly spaced configuration—or both. Another alternate embodiment might have the load balancing system installed on a propeller system, i.e., a vertically disposed set of props, rather than the previously described rotor system, i.e., a horizontally disposed set of rotors. The principles of the inventive load balancing system would apply equally as well to a propeller system as to a rotor system.

As claimed herein, the present invention is directed to a load balancing system for a system of rotating elements. The load balancing system is designed to be used in a system of rotating elements that has two or more blades on the system of rotating elements. The two or more blade extend away from and are uniformly spaced around an axis of rotation of the system of rotating elements. Two or more balancing tubes are rotationally attached to the two or more blades. Each of the two or more balancing tubes define an enclosed hollow space containing a weighted fluid.

The system of rotating elements may contain two, three, four, five, or more blades as may be reasonably designed. The load balancing system may have a number of balancing tubes that exactly equals the number of blades. Alternatively, the number of balancing tubes may be less than the number of blades, provided however, that the balancing tubes are uniformly spaced around the axis of rotation and uniformly dispersed around the blades so as to be balanced.

The two or more balancing tubes are preferably uniformly spaced around the axis of rotation. The weighted fluid preferably comprises mercury.

The two or more balancing tubes are attached to an end of the two or more blades distal from the axis of rotation. When attached to the end of the blades, the two or more balancing tubes preferably freely rotate relative to the two or more blades to which they are attached.

The two or more balancing tubes preferably have a degree of curvature that is equal to an arc of a circle having a diameter that is at least three times a width of one of the two or more blades. The two or more balancing tubes have an overall length such that each end of the two or more balancing tubes extends beyond a leading edge and a trailing edge of the two or more blades by no more than 5% of the overall length. In a particular embodiment, each end of the two or more balancing tubes extends beyond the leading edge and the trailing edge of the two or more blades by no more than 1½ inches.

Each of the one or more balancing tubes is preferably made of stainless steel. In addition, each of the one or more balancing tubes includes an insulating liner in the enclosed hollow space.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
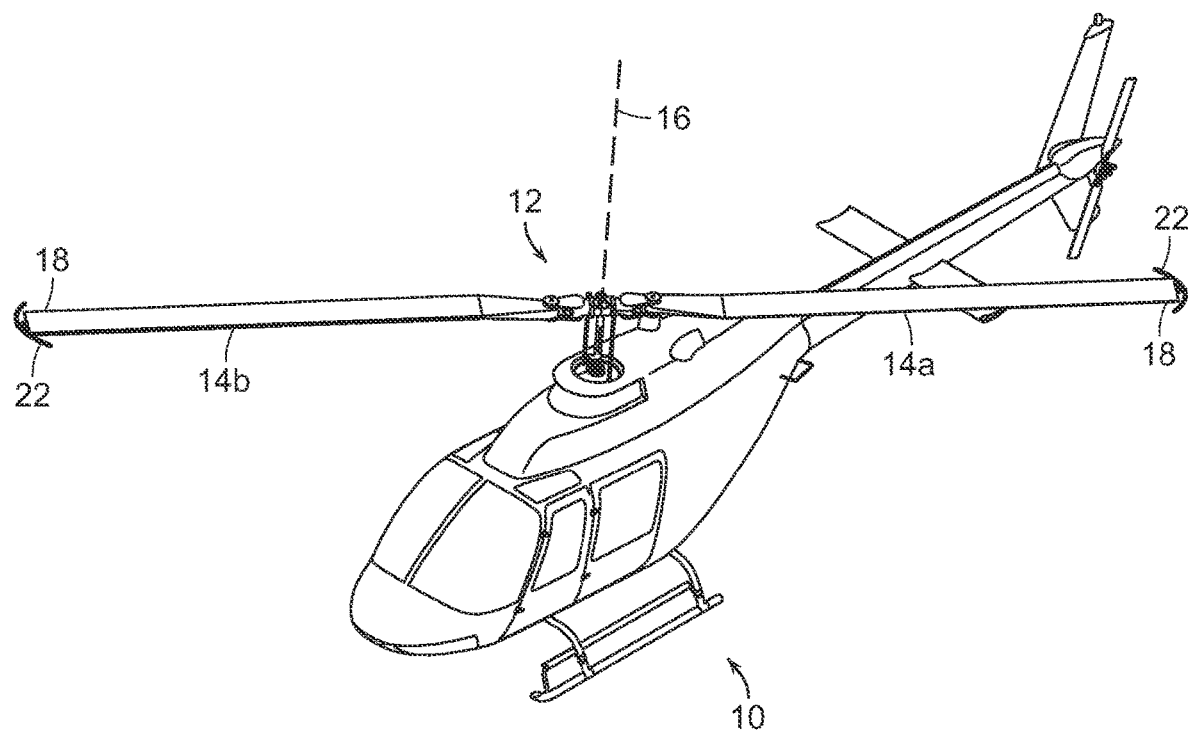
FIG. 1 is a perspective view of a helicopter incorporating the inventive load balancing system.

The present invention is directed to load balancing system, generally referred to by reference numeral 20 in FIGS. 1-11. The inventive load balancing system 20 is configured to be used with a system of rotating elements as in a helicopter rotor or similar vehicle. The system 20 generally includes two or more hollow, closed-ended tubes 22 freely attached to the system of rotating elements as described below.

Figure 2:
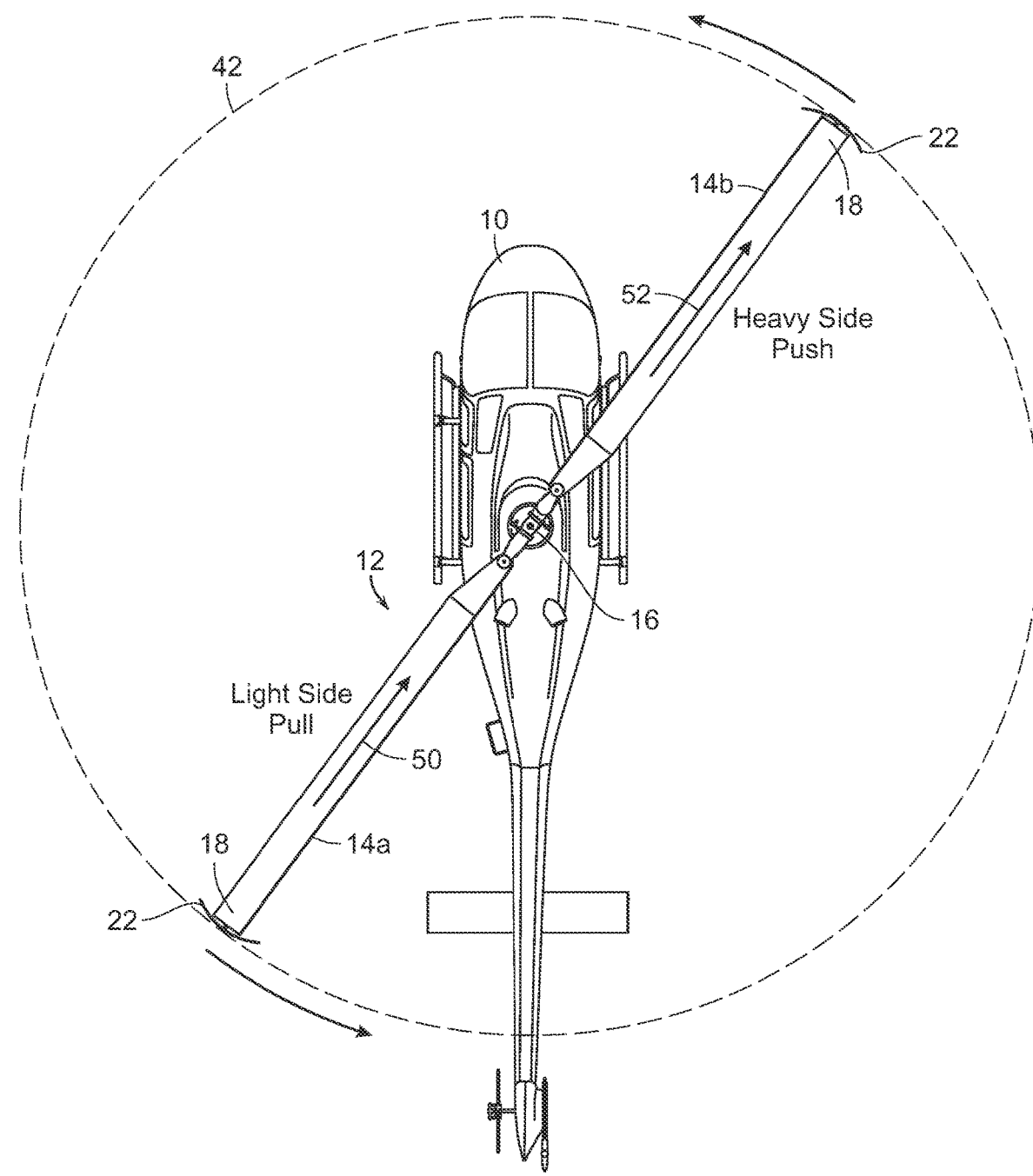
FIG. 2 is a top view of the helicopter in FIG. 1.

FIGS. 1 and 2 illustrate a helicopter 10 having a horizontally oriented rotor 12 with two blades 14a, 14b disposed linearly across an axis of rotation 16. In this embodiment, the tubes 22 of the inventive load balancing system 20 are attached to the outermost end 18 of each rotor blade 14a, 14b. However, as understood by a person of ordinary skill in the art, the balancing system 20 would function with the tubes 22 attached at any point along the rotor blades 14a, 14b, albeit less effective at balancing.

Although this detailed description specifically refers to a helicopter 10 with two rotor blades 14a, 14b, the inventive system 20 will operate on helicopters and other vehicles with rotor or propeller systems having any number of blades. The balancing system 20 will preferably have tubes 22 attached to each blade or prop, but may be attached to fewer, so long as the tubes 22 of the balancing system are uniformly or equally spaced around the axis of rotation of the rotor or propeller system.

Figure 3:
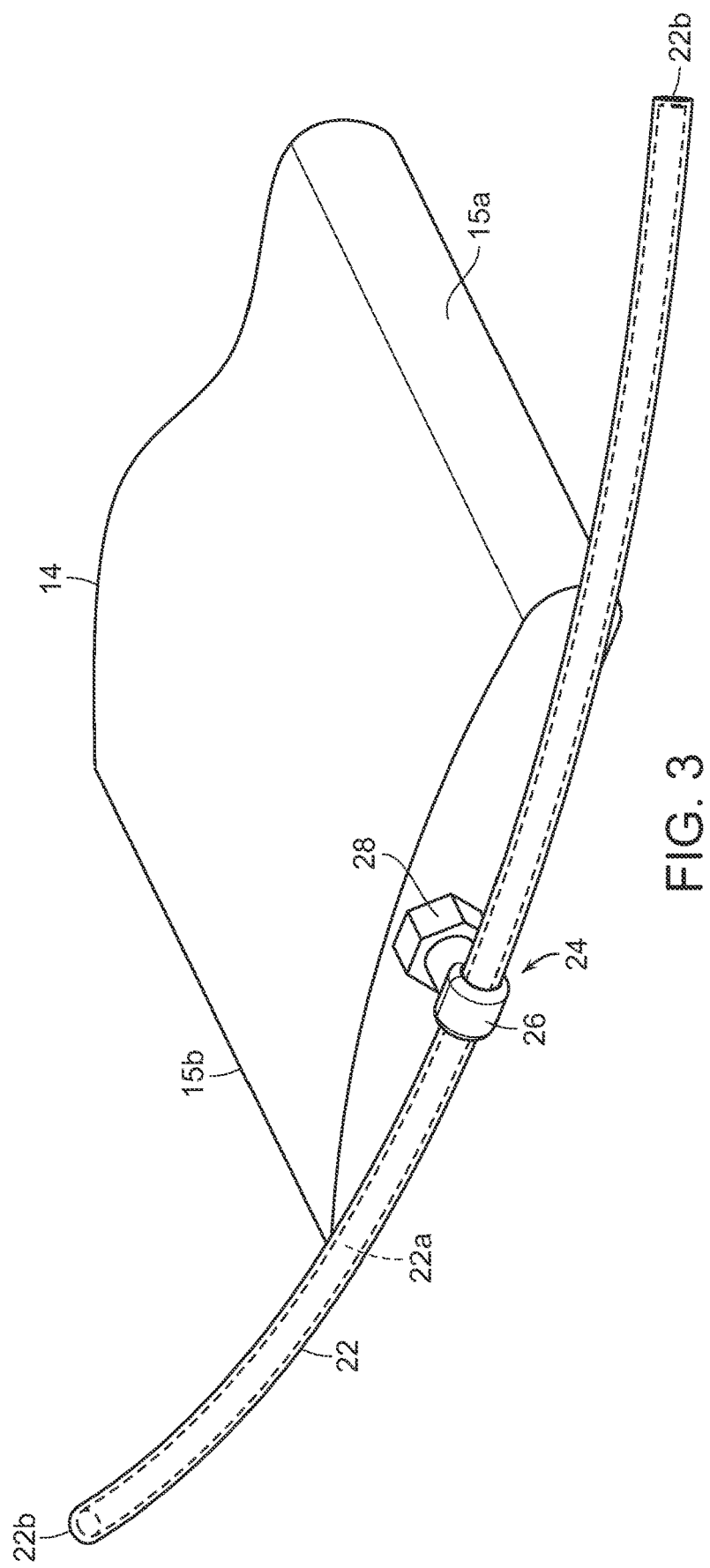
FIG. 3 is a close-up perspective view of a helicopter rotor blade including a balancing tube of the inventive load balancing system attached thereto.
Figure 4:
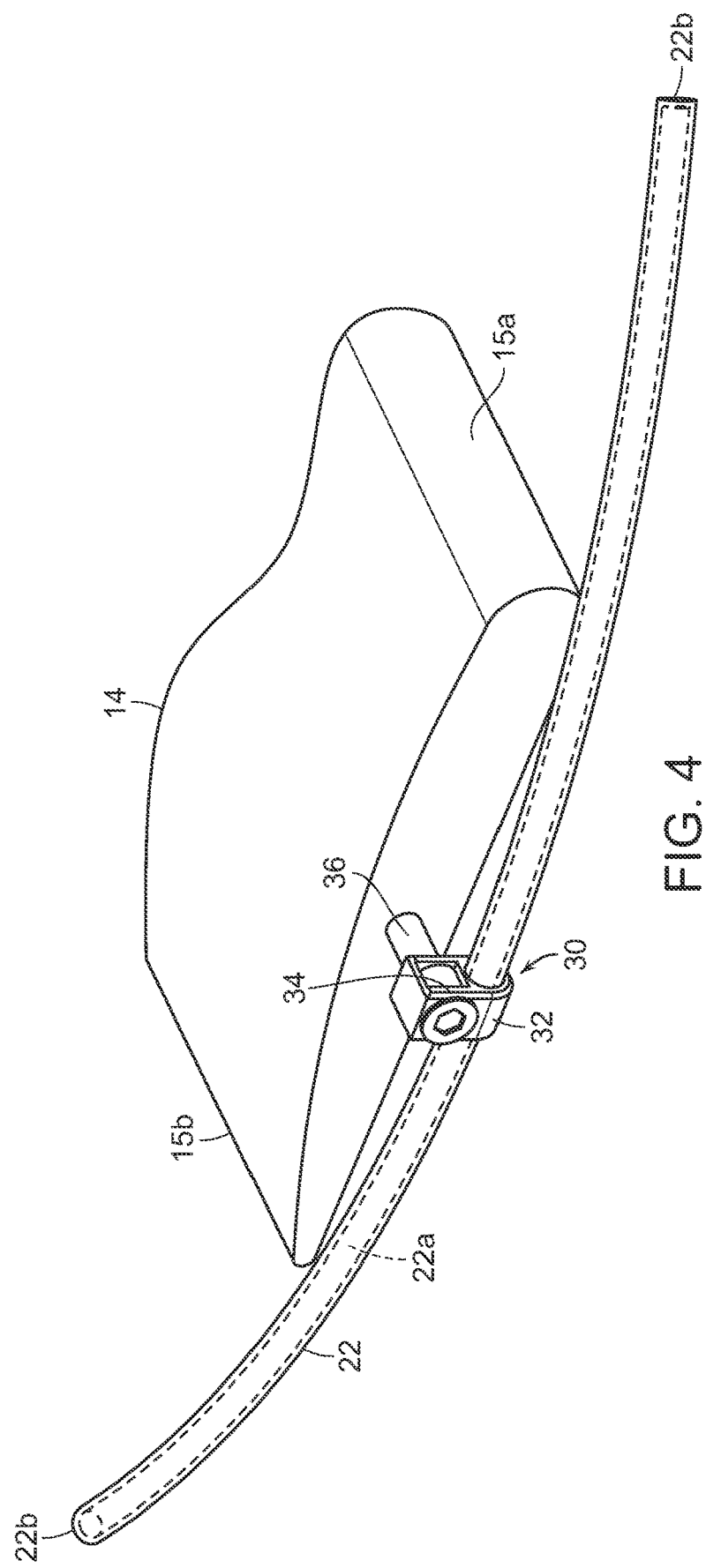
FIG. 4 is a close-up perspective view of a helicopter rotor blade including a balancing tube of the inventive load balancing system attached thereto.

FIGS. 3 and 4 illustrate an outermost end 18 of a blade 14a, 14b showing a tube 22 fastened thereto. In one embodiment (FIG. 3), the tube 22 is attached to the blade 14a, 14b by a straight fastener 24 having an encircling sleeve 26 rotationally attached to a base 28, preferably with a hex- or other multi-sided shape. The base 28 is secured to the end 18 of the blade 14a, 14b by threaded or other secure connection (not shown). In another embodiment (FIG. 4), the tube 22 is attached to the blade 14a, 14b by an off-set fastener 30 having a sleeve 32 encircling the tube 22 and an adjacent opening 34 rotationally secured to a post 36 fixed to the end 18 of the blade 14a, 14b. The rest of the figures illustrate the off-set fastener 30, but the balancing system 20 will function as intended with the straight fastener 24 or any other securing fastener that allow for rotation as described below.

In both embodiments of fasteners 24, 30, the connection between the sleeves 26, 32 and the tube 22, and the base 28 or post 36 and end 18 of the blade 14a, 14b, are each configured to be securely fixed so as to remain rigid and not unintentionally separate from their respective securements. However, the connections between the sleeve 26 and base 28, and the opening 24 and post 26, are both freely rotating so that the tube 22 is rotational in a plane perpendicular to the blade 14a, 14b.

FIGS. 3 and 4 illustrate the tube 22 with internal broken lines indicating an internal hollow passageway 22a between closed ends 22b thereof. In addition, the tube 22 is illustrated as extending well beyond the leading edge 15a and trailing edge 15b of the blades 14a, 14b. This is exaggerated in the drawings to more clearly illustrate a curvature of the tube 22, which curvature allows for differences in distance from the axis of rotation 16 between the center of the tube 22 and the ends 22b. In a particularly preferred embodiment, when not exaggerated for purposes of illustration, the tube 22 extends only slightly beyond the leading edge 15a and trailing edge 15b of the blade 14a, 14b, while retaining the degree of curvature.

Figure 5:
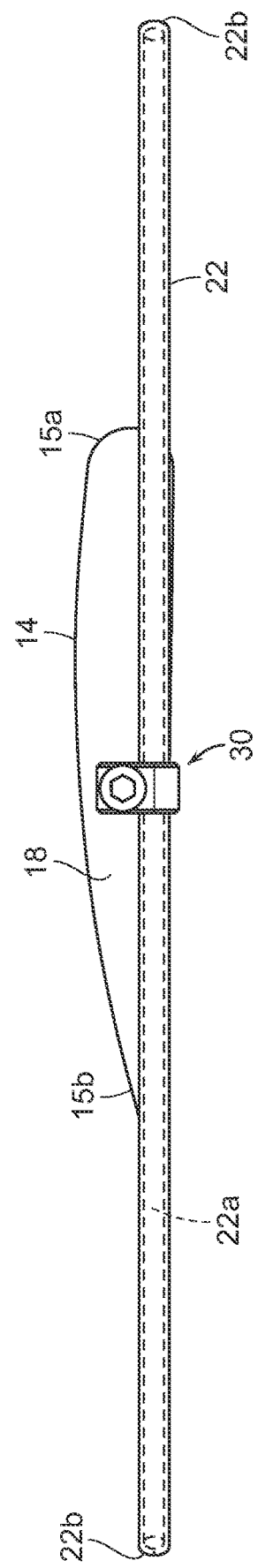
FIG. 5 is an end view of a helicopter rotor blade including a balancing tube of the inventive load balancing system attached thereto.
Figure 6:
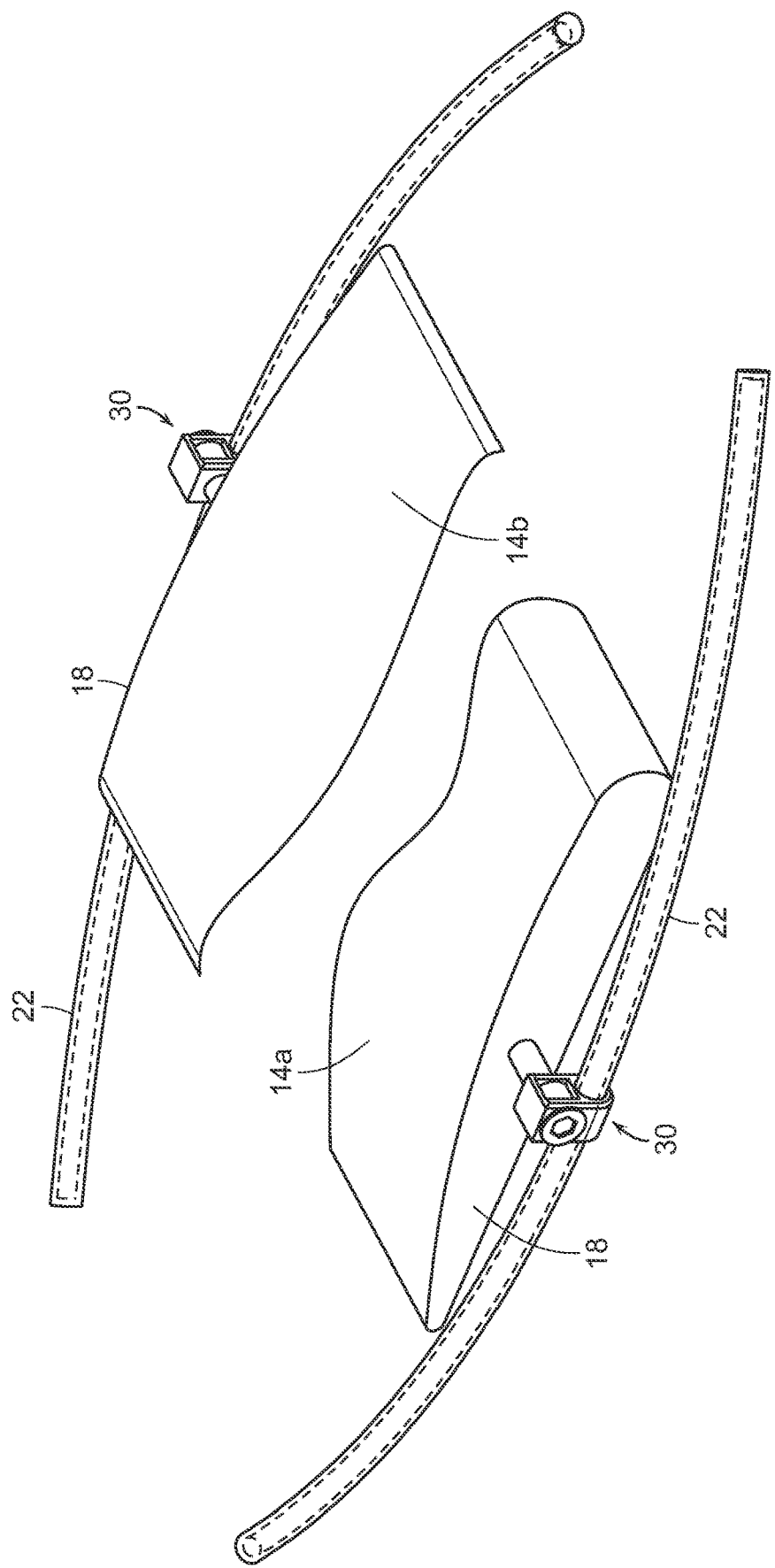
FIG. 6 is a foreshortened perspective view of both ends of a helicopter rotor blade system including a pair of balancing tubes of the inventive load balancing system attached thereto.
Figure 7:
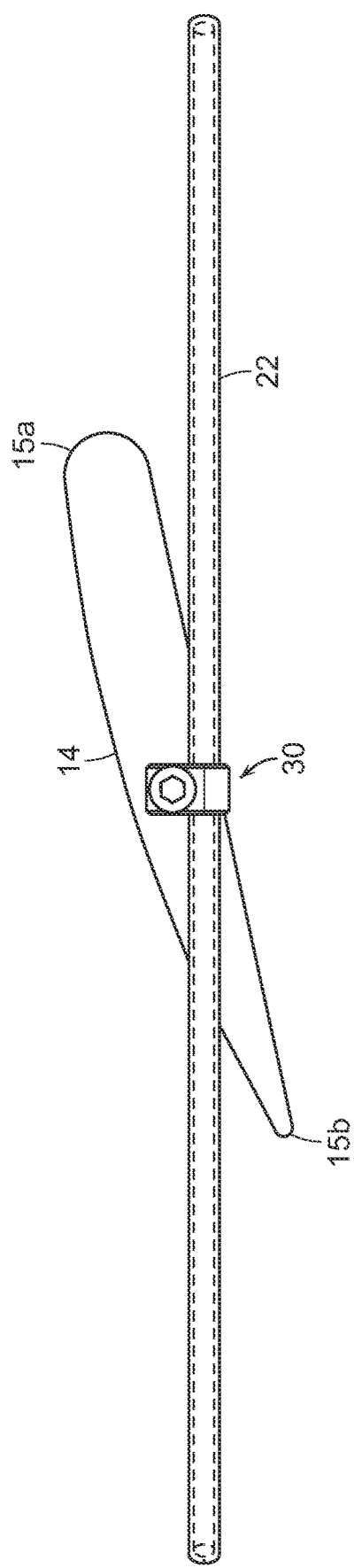
FIG. 7 is an end view of a helicopter rotor blade at an elevated pitch angle including a balancing tube of the inventive load balancing system attached thereto.

FIGS. 5-7 illustrate other views of the end 18 of the blades 14a, 14b with the attached tube 22 and fastener 30. As shown in FIG. 6, a tube 22 is attached to the end 18 of each opposing blade 14a, 14b in a mirrored configuration. Comparing FIGS. 5 and 7, the freely rotational configuration of the fasteners 24, 30 allow for the tube 22 to remain in a horizontal plane whether the blade 14a, 14b is oriented in the horizontal plane or at a pitch angle above or below the horizontal plane.

Figure 8:
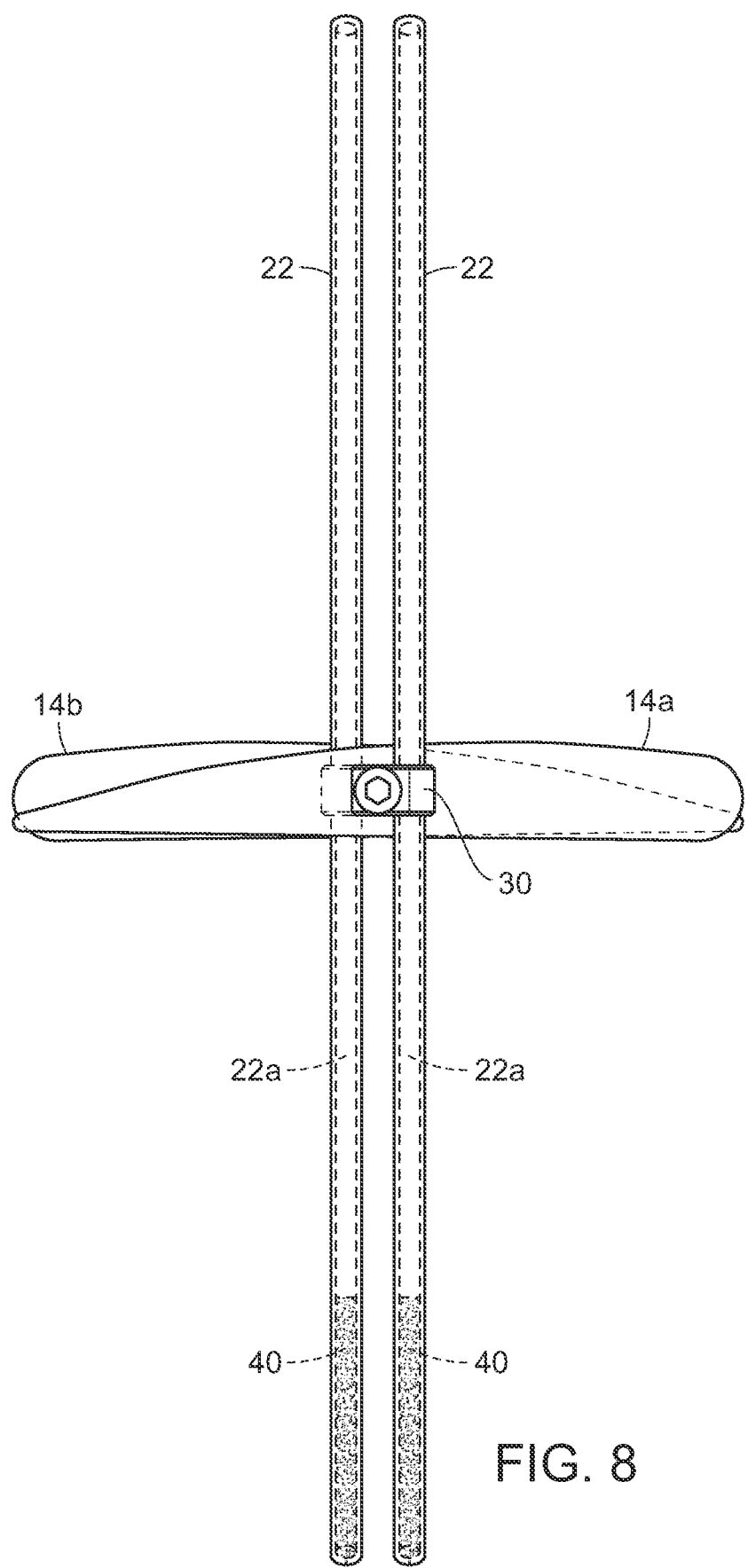
FIG. 8 is an end view of a stationary helicopter rotor blade system including a pair of balancing tubes of the inventive load balancing system attached thereto.

FIG. 8 illustrates the balance system 20 attached to the ends 18 of the blades 14a, 14b similar to those shown in FIG. 5 or 6. However, the tubes 22 in this illustration are shown with a quantity of a weighted fluid 40 within the hollow passage 22a. As shown in FIG. 8, the weighted fluid 40 causes the tube 22 to orient vertically when the rotor 12 is in a stopped or stationary position. The force of gravity pulls on the weighted fluid 40 and the freely rotational configuration of the fastener 24, 30 results in the vertical orientation. In an alternative embodiment, the fasteners 24, 30 may include stop limiters (not shown) that prevent the tubes 22 from rotating away from the plane of rotation 42 by more than plus or minus 30 degrees.

Figure 9:
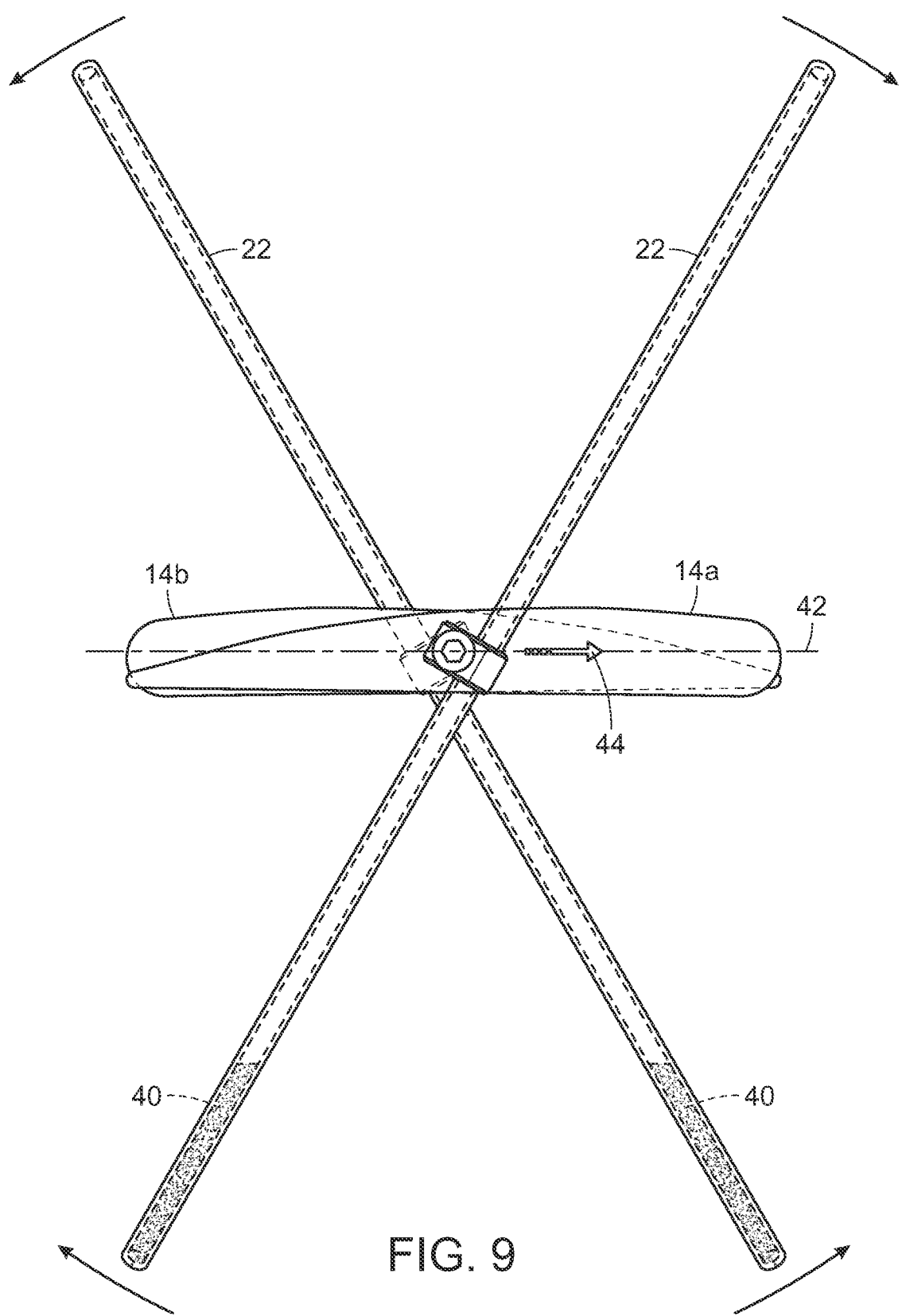
FIG. 9 is an end view of a helicopter rotor blade system at a starting-up rotation speed including a pair of balancing tubes of the inventive load balancing system attached thereto.

FIG. 9 illustrates a configuration similar to that in FIG. 8, but shows the start-up rotation of the rotor system 12, with the rotor rotating clockwise in the plane of rotation 42 when looking from the top down. The proximate blade 14a is illustrated as having a direction (left to right on the page) and relative speed (slower start-up) of rotation Indicated by arrow 44. Although not illustrated by an arrow, because of the overall clockwise rotation, the distal blade 14b is rotating in an opposite direction (right to left on the page) at the same relative speed (slower start-up). At this start-up speed, the tubes 22 will be angled in such a way that the weighted fluid 40 will slightly trail the direction of rotation 44, particularly as the rotor 12 rotates faster.

Figure 10:
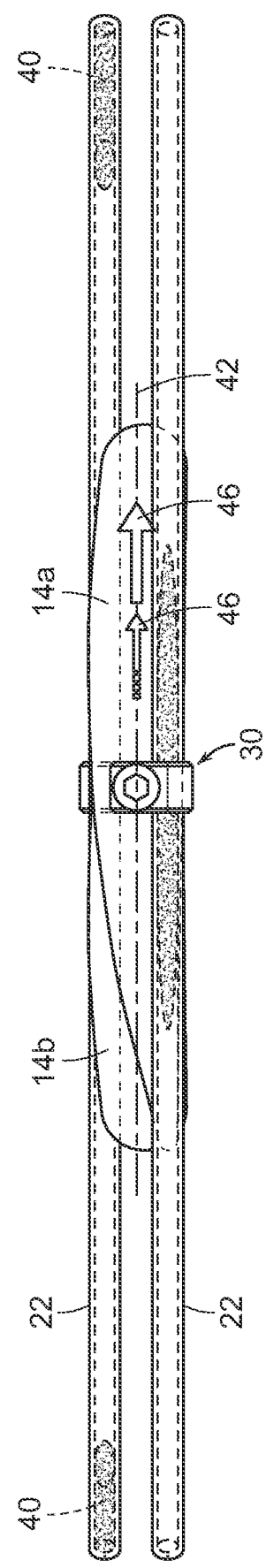
FIG. 10 is an end view of a helicopter rotor blade system at full rotation speed including a pair of balancing tubes of the inventive load balancing system attached thereto.

As the rotor 12 reaches full rotation speed, indicated by arrows 46 the tubes 22 will level out such that the tubes 22 are generally parallel to the plane of rotation 42. This configuration is shown in FIG. 10, which also shows the weighted fluid 40 differently dispersed in the tubes 22 depending on the forces acting on the balancing system 20. This different dispersion results from the type of unbalanced forces acting on a particular blade as described more fully below.

For purposes of illustration, in FIG. 10, the off-set fastener 30 of tube 22 on the distal blade 14b is flipped opposite from that on the proximal blade 14a. This is done to more clearly illustrate the possibility of different dispersions. Although it is preferred that in operation the off-set fasteners 30 are both oriented in the same direction, the load balancing system 20 will still function as intended if the off-set fasteners 30 are oppositely oriented. Because of the rounded nature of the hollow passage 22a, the weighted fluid 40 can adjust its position to compensate for the off-set fasteners 30 being oppositely oriented.

Figure 11:
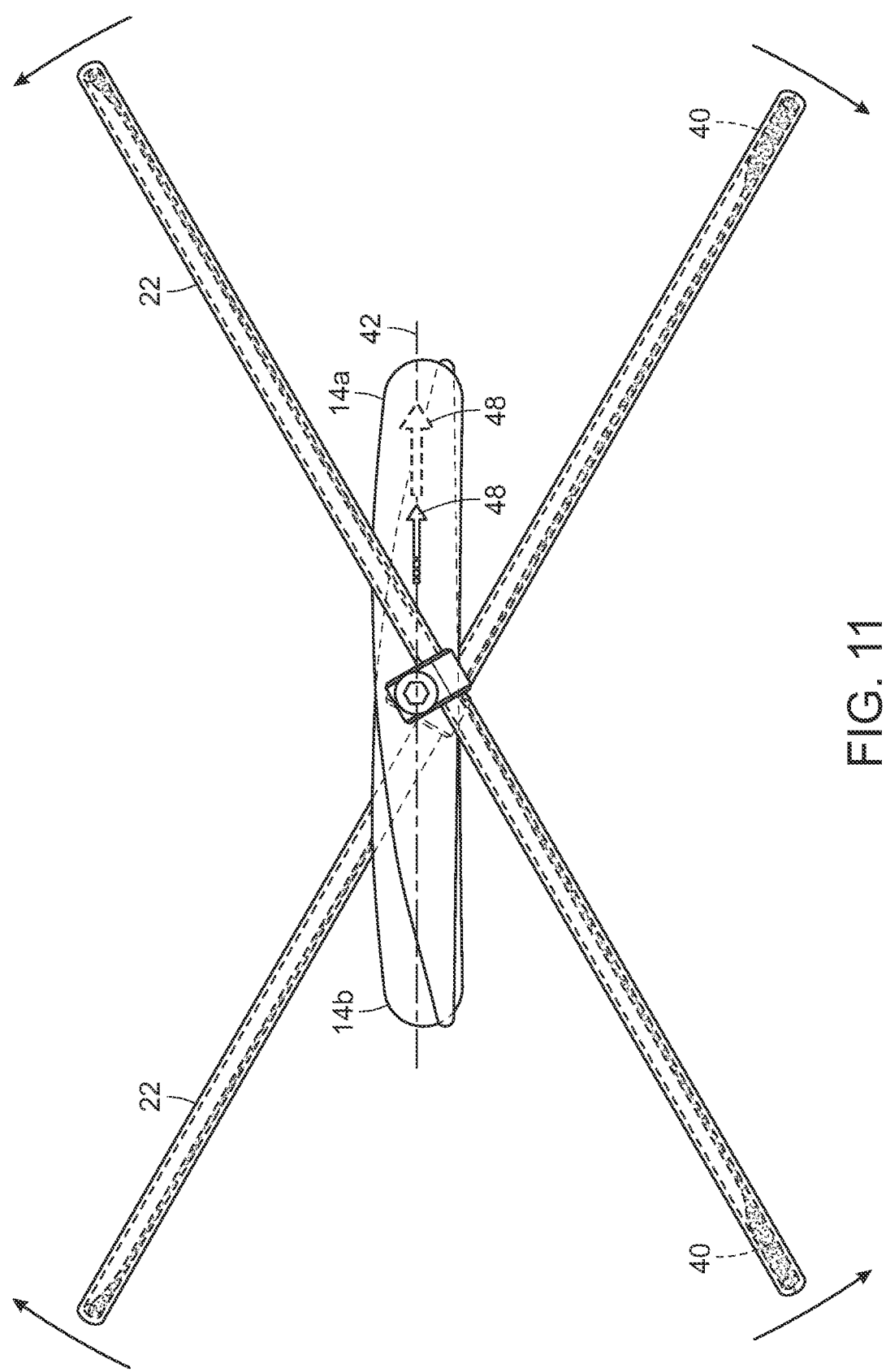
FIG. 11 is an end view of a helicopter rotor blade system at a slowing-down rotation speed including a pair of balancing tubes of the inventive load balancing system attached thereto.

When stopping the helicopter 10, the rotors 12 begin slowing down as indicated by arrows 48 in FIG. 11. As the speed of rotation of the rotors 12 decreases, the forces keeping the tubes 22 parallel to the plane of rotation 42 lessen and the tubes 22 begin returning to the vertical orientation of FIG. 8. The weighted fluid 40 returns from the dispersions in the tubes 22 mentioned above and flows to the lowest point of each tube 22, until finally coming to rest in the bottom end of the tube 22 when in the vertical position.

In reference to FIG. 2, the rotor 12 is illustrated with an unbalanced configuration where the first blade 14a is a "light side" of the rotor 12 with a force arrow 48 pulling the blade 14a inward toward the axis of rotation 16. In this same configuration, the second blade 14b is a "heavy side" of the rotor 12 with a force arrow 50 pushing the blade 14b outward away from the axis of rotation 16. To be clear, these pulling and pushing forces 48, 50 are not acting separately, but in unison and follow the rotor 12 around the plane of rotation. Without the load balancing system 20 described herein, the pulling forces 48 and pushing forces 50 cause the rotor 12 to operate in a constant state of imbalance, resulting in increased wear and tear on the rotor system 12.

Figure 10A:
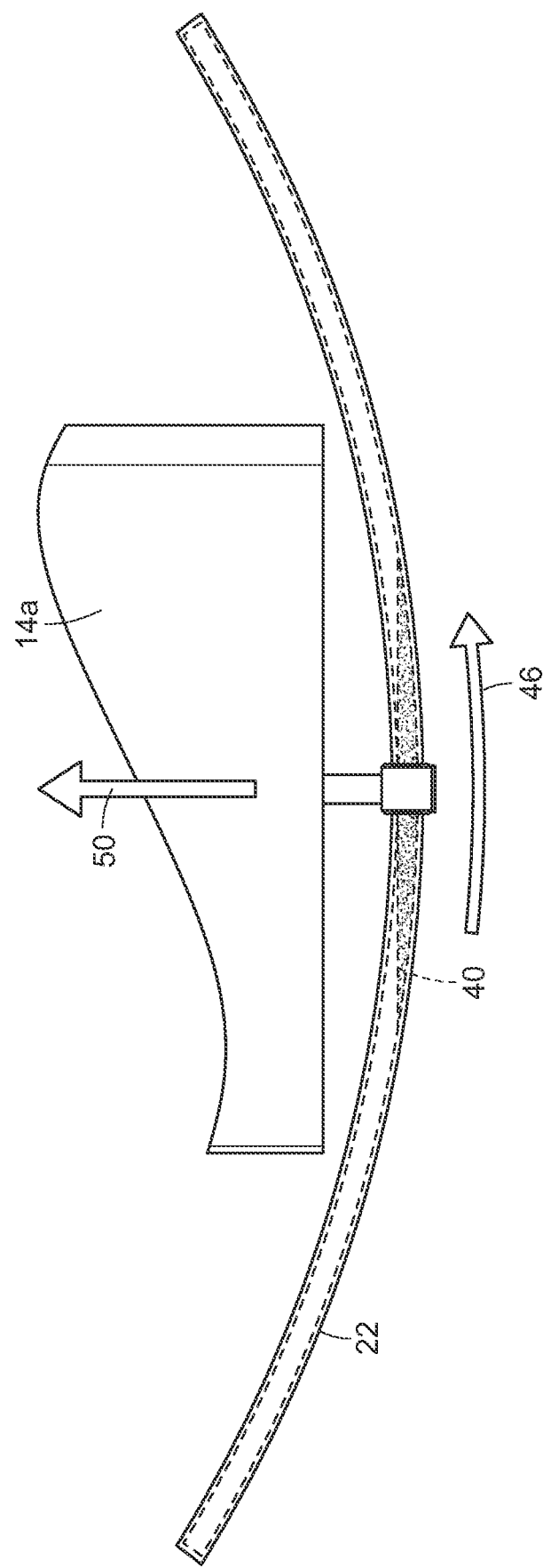
FIG. 10A is a top view of an end of a helicopter rotor blade at full rotation speed including a balancing tube of the inventive load balancing system attached thereto.
Figure 10B:
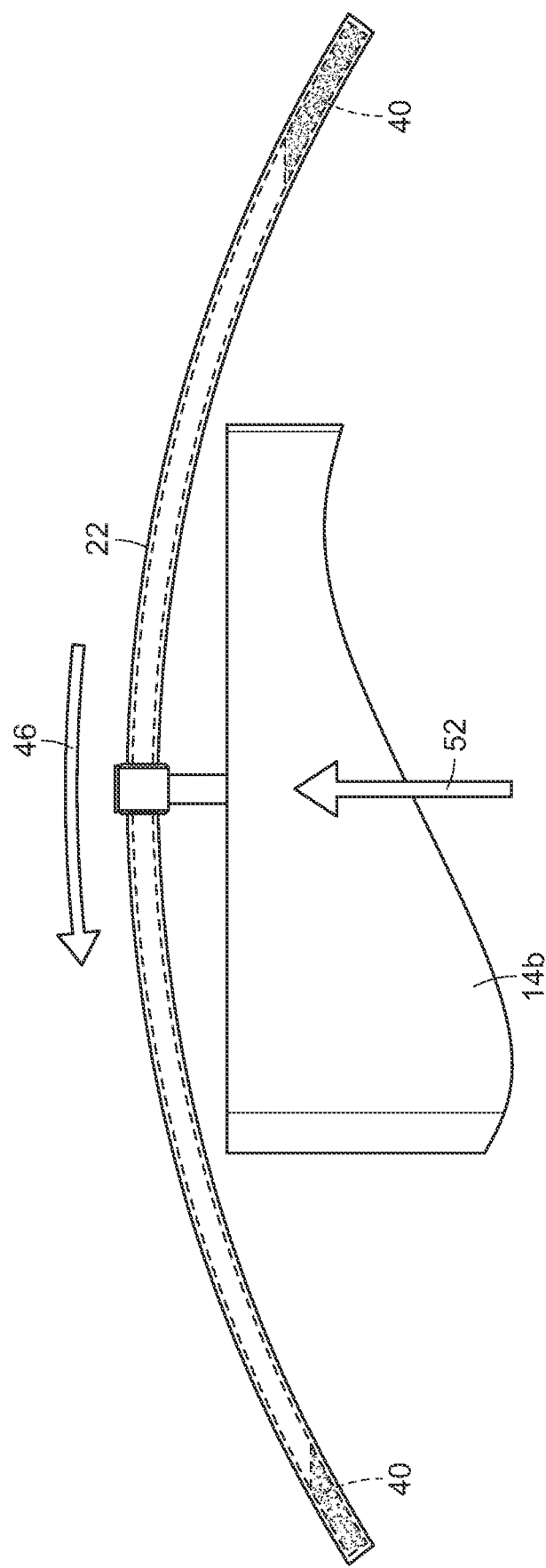
FIG. 10B is a top view of an end of a helicopter rotor blade at full rotation speed including a balancing tube of the inventive load balancing system attached thereto.

The tubes 22 of the load balancing system 20 operate in unison to counter this state of imbalance. As shown in FIGS. 10A and 10B, the weighted fluid 40 reacts differently within the tubes 22 depending on the particular forces 48, 50 acting on a blade 14a, 14b.

FIG. 10A illustrates the blade 14a subjected to the inward pulling forces 48 toward the axis of rotation. To counter these pulling forces 48, the weighted fluid 40 will collect closer to the center of the tube 22. With the weighted fluid 40 concentrated in the center of the tube 22, the weight is at its most outward point in the plane of rotation, which create greater centrifugal forces.

FIG. 10B illustrates the blade 14b subjected to the outward pushing forces 50 away from the axis of rotation. To counter these pushing forces 50, the weighted fluid 40 will divide its mass between the opposite ends 22b of the tube 22. With the weighted fluid 40 split between the ends 22b of the tube 22 and because of the curve of the tube 22, the weight of the fluid 40 is at a more inward point in the plane of rotation when compared to the opposite tube 22 (FIG. 10A), which create smaller centrifugal forces.

The greater centrifugal forces reacting to the pulling forces 48 (FIG. 10A) combined with the lesser centrifugal forces reacting to the pushing forces 50 (FIG. 10B) cooperate to counteract the general state of imbalance. Because of the ability of the weighted fluid 40 to flow and react to changes in forces, the dispersion of weighted fluid 40 in each tube 22 will vary as needed to counter-balance the forces.

The weighted fluid 40 is preferably a quantity of mercury or similarly behaving non-friction fluid. Although mercury is a toxic material, given its relative density, the amount of mercury needed for the load balancing system 20 to perform satisfactorily is not significant. It is believed that on a standard helicopter 10, each tube 22 likely only needs to contain 10 grams of mercury at most. At atmospheric temperatures, 10 grams of mercury is only about 0.74 milliliters. A greater quantity of mercury may be needed for rotor systems 12 of significantly greater weights, but even then it is not significantly more because of the distance between the tubes 22 and the axis of rotation 16.

Figure 12:
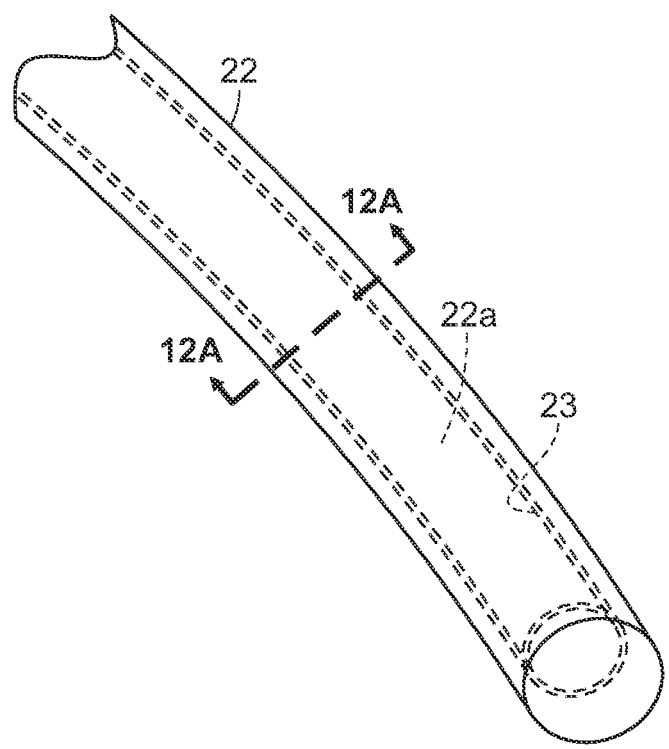
FIG. 12 is a close-up, cut-away view of a balancing tube of the inventive load balancing system.
Figure 12A:
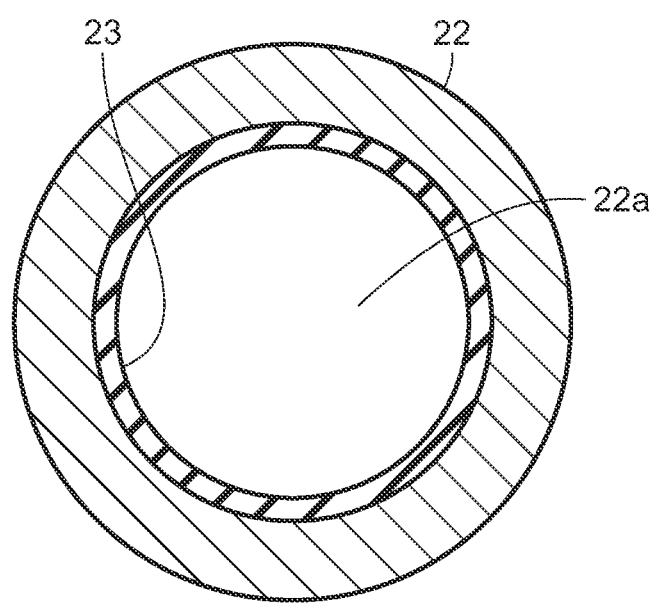
FIG. 12A is a cross-section of a balancing tube taken along line 12A-12A of FIG. 12.

FIGS. 12 and 12A illustrate an interior structure of the tube 22. The balancing tube 22 is preferably made from stainless steel or similarly non-reactive material. The hollow space 22a of the tube 22 preferably includes an insulating tube liner 22c. The insulating liner 22c should be non-porous, non-reactive, and non-absorbent to the weighted fluid 40, particularly mercury.

The insulating tube liner 22c is configured to protect the weighted fluid 40 against extremes of temperature, particularly cold temperatures. If temperatures in the tube 22 reaches the freezing point of the weighted fluid 40, the load balancing system 20 will not operate as intended. As the weighted fluid 40 approaches the freezing point, its viscosity will increase thereby decreasing its ability to flow. Once the weighted fluid 40 reaches the freezing point, it will begin to solidify and lose all ability to flow.

In the case of mercury as the weighted fluid 40, its freezing point is approximately −37.89° F. Such a temperature would not likely be reached in most environments. However, in certain extremes and/or at certain altitudes, such a temperature can be reached in ambient conditions on land or even at high rotation speeds during operation. Thus, the insulating tube liner 22c helps to prevent the weighted fluid 40 from reaching the freezing point, particularly when in extreme conditions and/or at higher altitudes.

Various detailed embodiments of the present invention are disclosed herein. However, it should be understood, that the disclosed embodiments are merely exemplary of the invention, which may be embodied in various forms. Various modifications may be made without departing from the scope and spirit of the invention. Accordingly, the invention is not to be limited, except as by the appended claims.

What is claimed is:

1. A load balancing system for a system of rotating elements, comprising:
    two or more blades on the system of rotating elements extending away from and uniformly spaced around an axis of rotation; and
    two or more balancing tubes rotationally attached exteriorly to the two or more blades, wherein each of the two or more balancing tubes define an enclosed hollow space containing a weighted fluid.

2. The load balancing system of claim 1, wherein the two or more balancing tubes are uniformly spaced around the axis of rotation.

3. The load balancing system of claim 1, wherein the weighted fluid comprises mercury.

4. The load balancing system of claim 1, wherein the two or more balancing tubes are attached to an end of the two or more blades distal from the axis of rotation.

5. The load balancing system of claim 4, wherein the two or more balancing tubes freely rotate in a perpendicular plane relative to the two or more blades to which the two or more balancing tubes are attached.

6. The load balancing system of claim 1, wherein the two or more balancing tubes have a degree of curvature that is equal to an arc of a circle having a diameter that is at least three times a width of one of the two or more blades.

7. The load balancing system of claim 6, wherein the two or more balancing tubes have an overall length such that each end of the two or more balancing tubes extends beyond a leading edge and a trailing edge of the two or more blades by no more than 5% of the overall length.

8. The load balancing system of claim 7, wherein each end of the two or more balancing tubes extends beyond the leading edge and the trailing edge of the two or more blades by no more than 1½ inches.

9. The load balancing system of claim 1, wherein each of the two or more balancing tubes is made of stainless steel.

10. The load balancing system of claim 9, wherein each of the two or more balancing tubes includes an insulating liner in the enclosed hollow space.

* * * * *